United States Patent [19]
Mangelsen et al.

[11] Patent Number: 6,023,045
[45] Date of Patent: Feb. 8, 2000

[54] TORCH REAMER AND METHOD FOR USING SAME

[75] Inventors: Chris Mangelsen, Charlotte; Fred Remley, Blue Grass, both of Iowa

[73] Assignee: Genesis Systems Group, Davenport, Iowa

[21] Appl. No.: 09/211,585

[22] Filed: Dec. 14, 1998

[51] Int. Cl.[7] .................................................. B23K 9/32
[52] U.S. Cl. ............................................ 219/136; 15/93.1
[58] Field of Search .......................... 219/136, 74, 137.2, 219/137.43; 15/93.1

[56] References Cited

U.S. PATENT DOCUMENTS

| | | | |
|---|---|---|---|
| 4,583,257 | 4/1986 | Bridges et al. | 15/93.1 |
| 4,702,195 | 10/1987 | Thielmann | 219/136 |
| 4,834,280 | 5/1989 | Thielmann | 219/137.2 |
| 5,070,568 | 12/1991 | Wilcox et al. | 15/93.1 |
| 5,138,969 | 8/1992 | Thielmann | 219/137.2 |
| 5,221,826 | 6/1993 | Lee et al. | 219/136 |
| 5,686,000 | 11/1997 | Nilsson | 219/136 |
| 5,845,357 | 12/1998 | Anderson | 15/93.1 |

*Primary Examiner*—Clifford C. Shaw
*Attorney, Agent, or Firm*—Zarley, McKee, Thomte, Voorhees & Sease

[57] ABSTRACT

A torch reamer includes a reamer assembly having a reamer bit and a motor which are movable toward and away from a work station. A clamping arm is pivotally mounted to a frame and is movable from an inoperative position to an operative position adjacent the work station. Movement of the clamp arm toward the work station causes a clamp member to clamp a torch nozzle and hold it in the work station while the reamer assembly rotates the reamer bit within the inside of the torch nozzle. Lifting of the torch nozzle causes the release of the clamp, the deactuation of the motor, and the retraction of the motor and reamer bit to an inoperative position.

16 Claims, 5 Drawing Sheets

TORCH REAMER AND METHOD FOR USING SAME

BACKGROUND OF THE INVENTION

This invention relates to a torch reamer and method for using same.

Welding torches include a cylindrical torch nozzle which surrounds the wire being used to weld at the location desired. Throughout extensive use of the welding torch, the inside of the torch nozzle becomes coated with various deposits resulting from the welding process.

It is therefore desirable from time to time to ream out the inside of the torch nozzle. This is particularly important in industrial applications where the welding torch is used extensively over long periods of time. Robotics are often used to hold the welding torches, and therefore it is desirable to have a torch reamer which can be coordinated for use to ream a welding torch mounted on a robot.

The torch nozzle is usually press fitted on the end of the welding torch, and therefore it is important that the torch nozzle be clamped or grasped during the reaming process so that the rotation of a reaming bit within the inside of the nozzle does not cause the nozzle to rotate.

The clamping mechanism for clamping the nozzle should also be capable of releasing the nozzle whenever the robot pulls the nozzle away from the reaming bit. If the clamp does not release, the result can be damage to the welding torch as the robot pulls the torch away from the clamped torch nozzle.

Torch reamers have been provided in the prior art for clamping and reaming the torch nozzle. However these prior art torch reamers are usually controlled by computer programs and electrical actuators. On occassion they fail to release the torch nozzle when the robot pulls away from the reamer. It is therefore desirable to have a torch reamer that is not computer controlled and that automatically clamps and unclamps the torch nozzle in a timely fashion.

Therefore a primary object of the present invention is the provision of an improved torch reamer and method for using same.

A further object of the present invention is the provision of a torch reamer which clamps the nozzle during the reaming operation, and which releases the clamped nozzle whenever the nozzle is moved away from the work station.

A further object of the present invention is the provision of a torch reamer which is actuated and deactuated mechanically whenever the welding torch is moved to or from the work-station.

A further object of the present invention is the provision of an improved torch reamer which causes actuation of the motor driving the reamer bit whenever the welding nozzle is moved to the work station.

A further object of the present invention is the provision of an improved torch reamer which moves the rotating reaming bit into the inside of the nozzle whenever the nozzle is at its work station.

A further object of the present invention is the provision of an improved torch reamer which is controlled entirely by a pneumatic and mechanical system, and does not require computer programming for controlling its operation.

A further object of the present invention is the provision of an improved torch reamer and method for using same which are economical in manufacture, durable in use, and efficient in operation.

SUMMARY OF THE INVENTION

The forgoing objects may be achieved by a torch reamer for removing deposits from the interior cylindrical surface of a welding torch nozzle, the torch reamer comprising a frame and a work station located in a predetermined position relative to the frame. A reamer assembly is comprised of a reamer bit and a motor connected to the reamer bit for rotating the reamer bit. A clamping arm includes a clamp thereon, and is movably connected to a frame for movement from an operative position to an inoperative position. A first spring yieldably urges the clamping arm to its inoperative position.

The clamp includes a clamp member movably mounted to the arm for movement from an unclamped position to a clamped position for clamping and gripping the welding torch nozzle. A first mechanism engages the clamp member and is adapted to move the clamp member to its clamped position in response to the clamp arm moving to its operative position. The first mechanism is also adapted to move the clamp member to its unclamped position in response to the clamp arm moving from its operative position to its inoperative position. The reamer assembly is mounted on the frame for movement from a retracted position to an extended position wherein the reamer bit extends within the nozzle cavity whenever the clamp is clamping and gripping the nozzle and the clamp arm is in its operative position.

A control system is connected to the clamp arm, a prime mover for moving the reamer assembly, and the motor. The control system causes actuation of the motor and the prime mover to move the reamer assembly to its extended position in response to the clamp arm being moved to its operative position.

The control circuit also causes the deactuation of the motor and actuation of the prime mover in response to movement of the clamp arm from its operative to its inoperative position to cause the reamer assembly to move to its retracted position.

In the preferred form of the invention the control circuit is a pneumatic circuit, and the motor and prime mover are also pneumatically powered. However, hydraulics circuits or electrical circuits could also be used.

The preferred mechanism for moving the clamp member from its unclamped to its clamped position comprises a cam engaging the clamp member and causing the clamp member to move to its clamped position in response to movement of the clamp arm to its operative position. The cam member also permits the clamp member to move to its unclamped position in response to movement of the clamp arm to its inoperative position.

The method for reaming a torch nozzle comprises inserting the nozzle into a clamp which is positioned on the clamping arm. The nozzle is moved into engagement with the clamp arm to cause movement of the clamp arm from its inoperative to its operative position. When it reaches its operative position the clamp arm actuates a motor for rotating a reaming bit connected to the motor. The motor and the reaming bit are then moved from a retracted position to an extended position wherein the reaming bit extends within the cylindrical cavity of the nozzle and removes the deposits on the cylindrical walls of the cavity. The nozzle is then moved away from the clamp arm so as to permit the clamp arm to return to its inoperative position. The motor is deactuated and moved to its retracted position in response to movement of the clamp arm to its inoperative position.

Another feature of the present method includes clamping the nozzle and gripping the nozzle with the clamp in response to movement of the clamp arm to its operative position. When the clamp arm is permitted to move away from its operative position the clamp unclamps from the nozzle.

DETAILED DESCRIPTION OF THE PREFERRED EMBODIMENT

Figure 1:
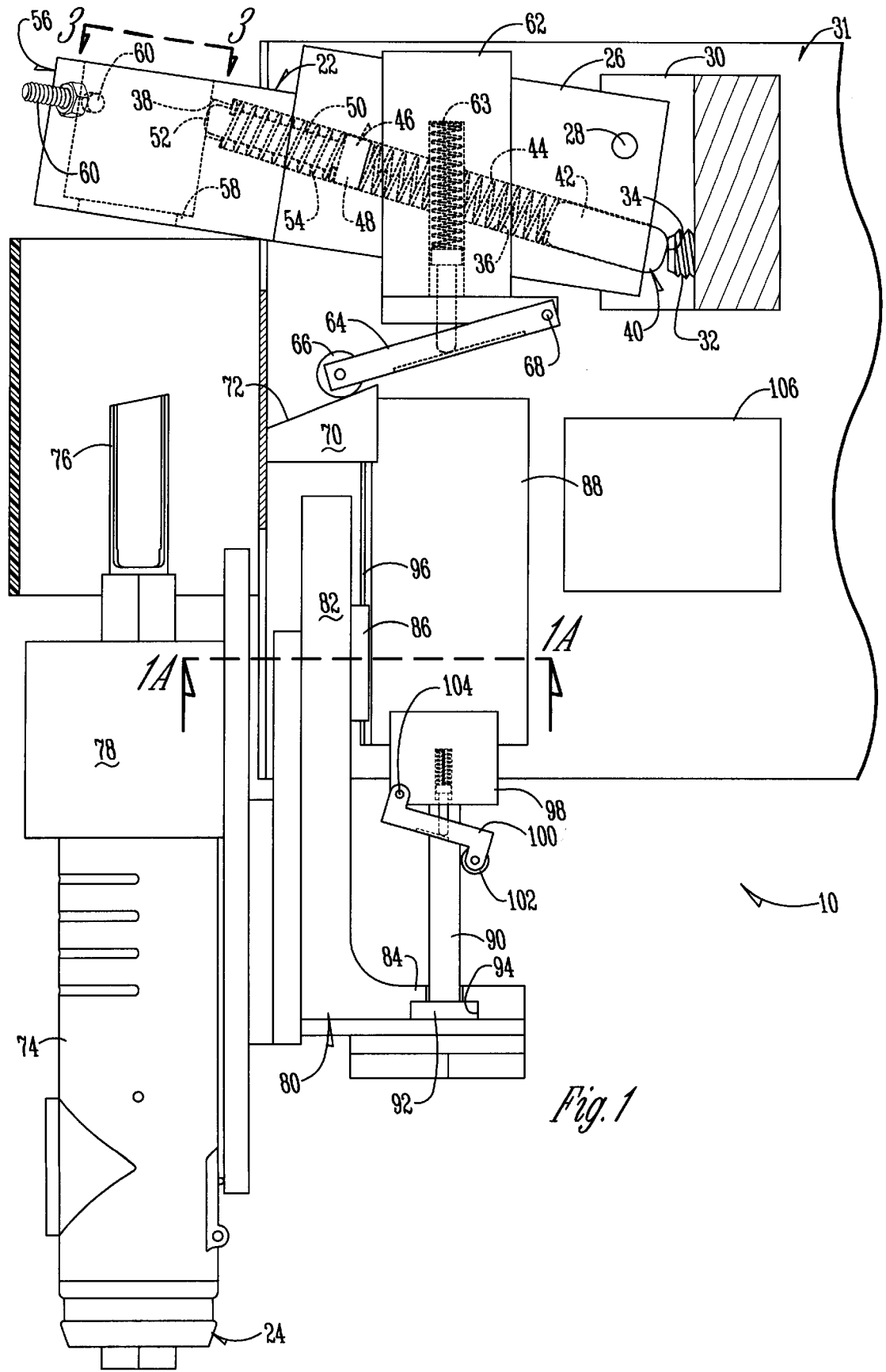
FIG. 1 is a side view of the torch reamer of the present invention, showing the clamping arm in section.

Referring to the drawings the numeral 10 generally designates the torch reamer of the present invention. The numeral 12 (FIG. 2) refers to a welding torch having a cylindrical torch nozzle 14 press fitted over the end thereof. The torch nozzle comprises a cylindrical wall 16 having a cylindrical cavity 18 therein. A welding wire extends along the axis of the cylindrical cavity 18.

The torch reamer 10 includes a clamp arm 22, and a reamer assembly 24. The clamp arm 22 includes an arm body 26 which is pivotally mounted by means of a pivot pin 28 to a stationary yoke 30 which is mounted to a frame or plate 31. A set screw 32 threadably extends through the rear of yoke 30 and includes a cam nose 34 on its inner end.

Arm body 26 includes a longitudinal bore 36 extending therethrough and having a reduced diameter bore 38 at its inner most end. Fitted within this bore is a pin assembly 40 comprising a first pin 42, a pressure relief spring 44, and a clamping pin 46. The clamping pin 46 is comprised of a head 48, a shank 50 and a shank end 52. A retracting spring 54 is compressed between head 48 and the shoulder created by reduced diameter portion 38 so as to yieldably urge the pin assembly to the right as viewed in FIG. 1.

As can be seen in FIG. 1 the cam nose 34 of the set screw 32 limits the rearward movement of the pin assembly 40. Furthermore, as the arm body 26 pivots downwardly about its pivot pin 28, the engagement between the cam nose 34 and the pin assembly 40 causes the shank end 52 to protrude further and further outwardly from the reduced diameter bore 38.

The reduced diameter bore 38 opens into the central opening of a cylindrical clamping collar 56. A washer 58 is mounted within this cylindrical opening and is adapted to engage the torch nozzle 14 when the torch nozzle is inserted therein. A plurality of clamping set screws are positioned around the circumference of the clamping collar 56 to position the nozzle centrally within that collar. As the clamp arm 22 lowers, the shank end 52 of clamping pin 46 extends outwardly and engages the torch nozzle 14 in the manner shown in FIG. 2 so as to hold the torch nozzle against rotational movement.

The pressure relief spring 44 exerts a pressure which is preferably approximately 40 pounds. If the pin 52 encounters a resistive force greater then the force of the spring 44, the spring 44 will yield, thereby preventing damage to parts.

Also mounted on the clamping arm 22 is a master switch 62. Switch 62 is preferably a pneumatic switch, but electrical switches may also be used if an electrical control circuit is used. Master switch 62 includes a master switch arm 64 having an arm roller 66 at one of its ends and having an arm pivot 68 pivotally connecting the arm 64 to the master switch 62. A spring 63 (shown schematically in FIGS. 1 and 2) yieldably urges the master switch arm 64 in a counter-clockwise direction as viewed in FIG. 1, and this spring bias causes the clamping arm 22 to normally pivot to its upper position as shown in FIG. 1.

The arm roller 66 rolls on a cam surface 72 of a cam block 70.

In operation, the torch 12 is moved so as to position the torch nozzle 14 within the central hole of clamping collar 56. The torch nozzle 14 is pressed against the washer 58 and continued downward pressure causes the clamp arm 22 to swing downwardly to the position shown in FIG. 2. This causes roller 66 of switch arm to roll against the cam surface 72 and to move the switch 62 to reverse its condition for purposes to be described more fully hereafter.

Reamer assembly 24 includes a motor 74 having a reaming bit 76 projecting therefrom. Actuation of motor 74 causes rotation of reamer bit 76.

Figure 1A:
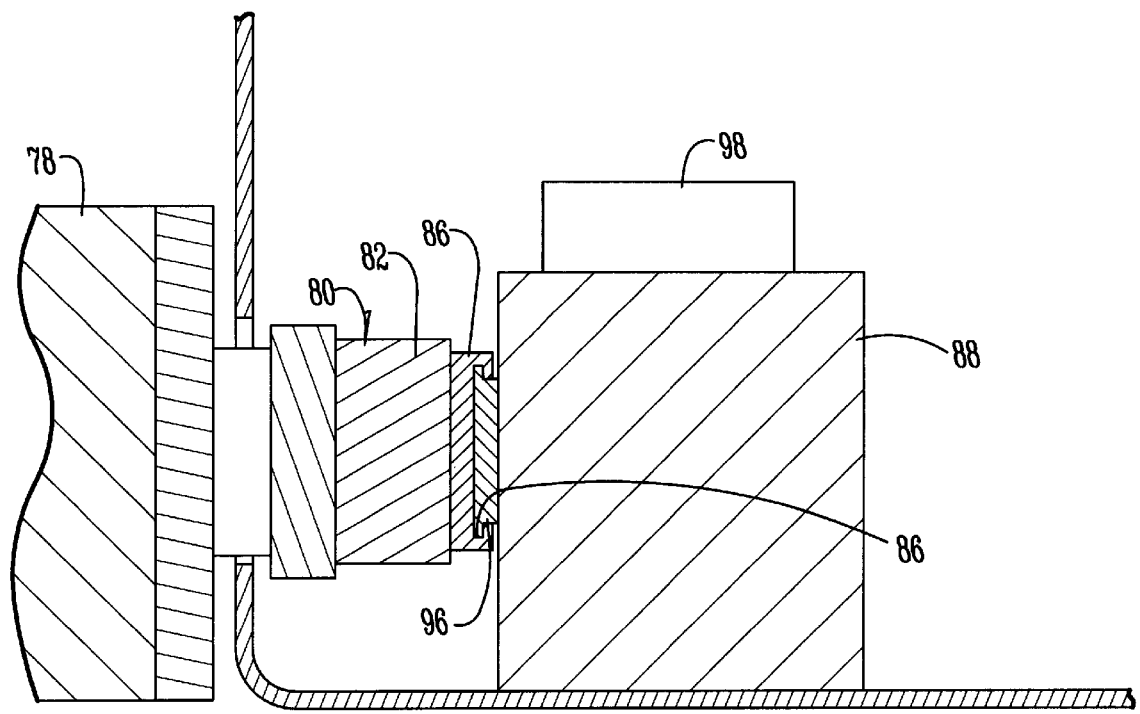
FIG. 1A is a sectional view taken along line 1A—1A of FIG. 1.

Reamer motor 74 is held by a reamer assembly frame 78 which in turn is attached to an L-shaped frame 80 having a vertical leg 82 and a horizontal leg 84. Vertical leg 82 is provided with a longitudinally extending C-shaped channel 86 (FIG. 1A).

Mounted to plate 31 is a double acting cylinder 88, preferably a pneumatic cylinder, having a piston rod 90 extending therefrom with a nut 92 on its lower end. Nut 92 is retained within a nut receptacle 94 in the horizontal leg 84 of the L-shaped frame 80.

The housing of the double acting cylinder 88 includes a T-shaped slide 96 thereon which is fitted for sliding within the C-shaped channel 86. The interlocking of the T-shaped slide 96 and the C-shaped channel 86, together with the connection of the horizontal leg 84 to the lower end of piston rod 90, permits the entire reamer assembly 24 to move from its lower inoperative position shown in FIG. 1 to its upper operative position shown in FIG. 2.

Mounted to the double acting cylinder 88 is an upper limit switch 98 having a limit switch arm 100 and an arm roller 102. Limit switch arm 100 is pivoted about axis 104.

Figure 2:
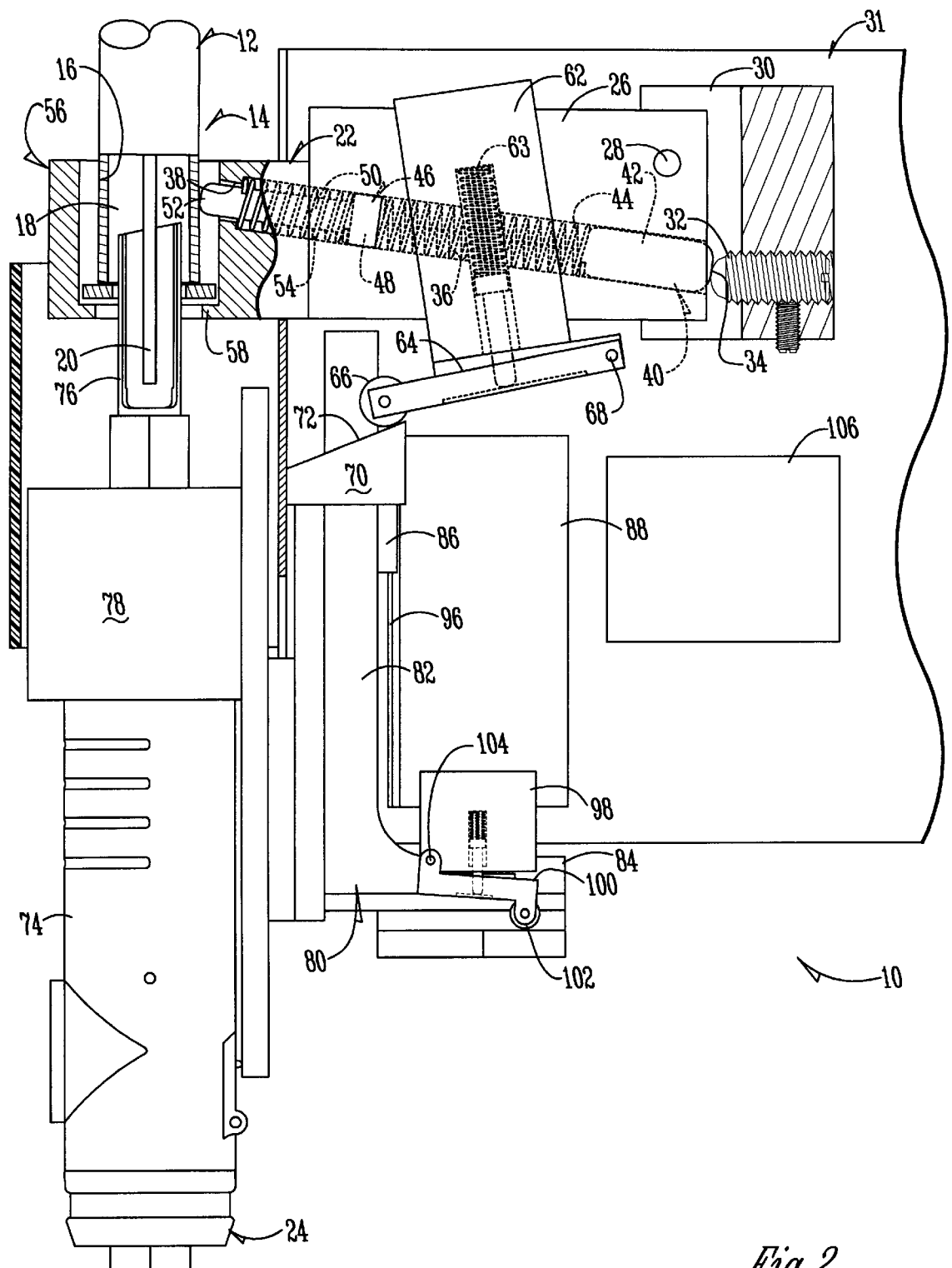
FIG. 2 is a view similar to FIG. 1, but showing the clamp arm in its lowered operative position, and showing the motor and reamer bit in their upper operative position with the bit inside the torch nozzle.
Figure 3:
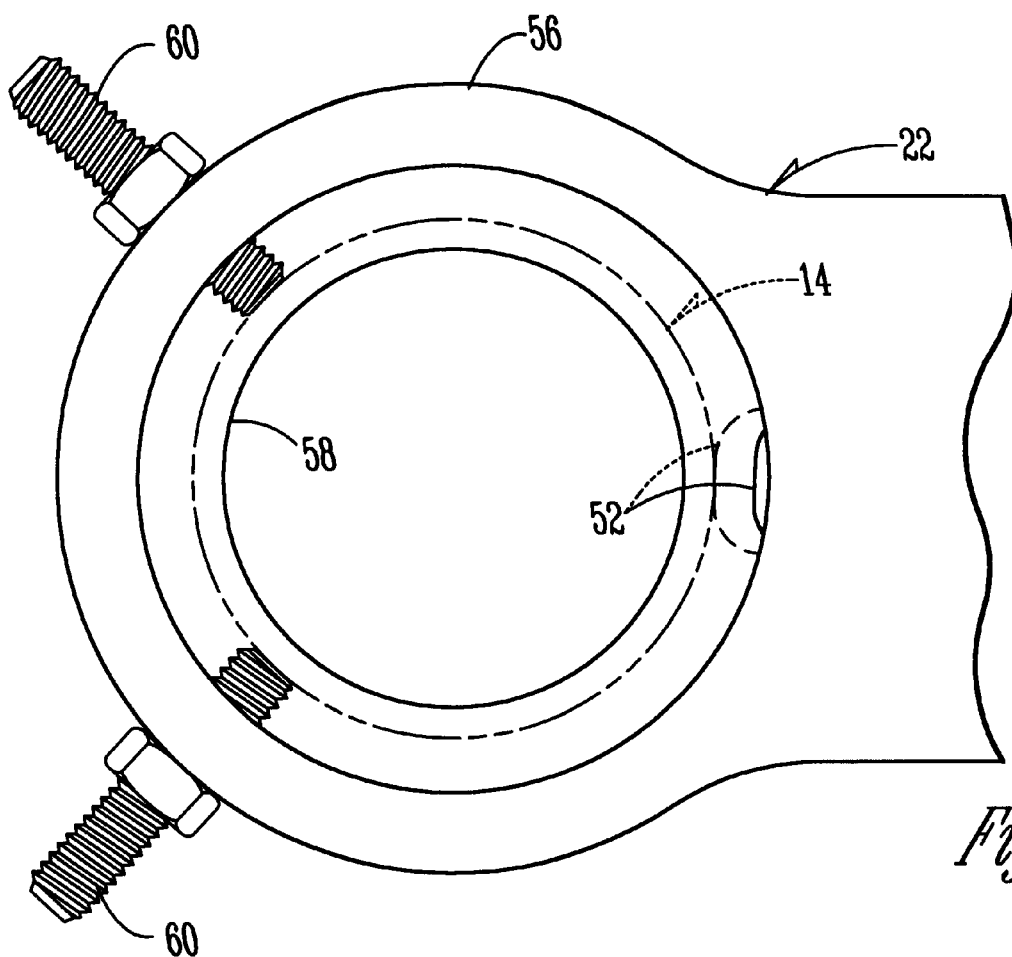
FIG. 3 is a sectional line taken along line 3—3 of FIG. 1.

The movement of the reamer assembly 24 from its lower position shown in FIG. 1 to its upper position shown in FIG. 2 causes the horizontal leg 84 to engage the roller 102 of the switch arm 100, and to rotate the switch arm 100 in a counterclockwise direction about axis 104.

The depth to which the reamer bit 76 penetrates the torch nozzle 14 can be adjusted by adjusting the effective length of shaft 90. For example shims can be added or removed from beneath nut 90 so as to make this adjustment.

Figure 4:
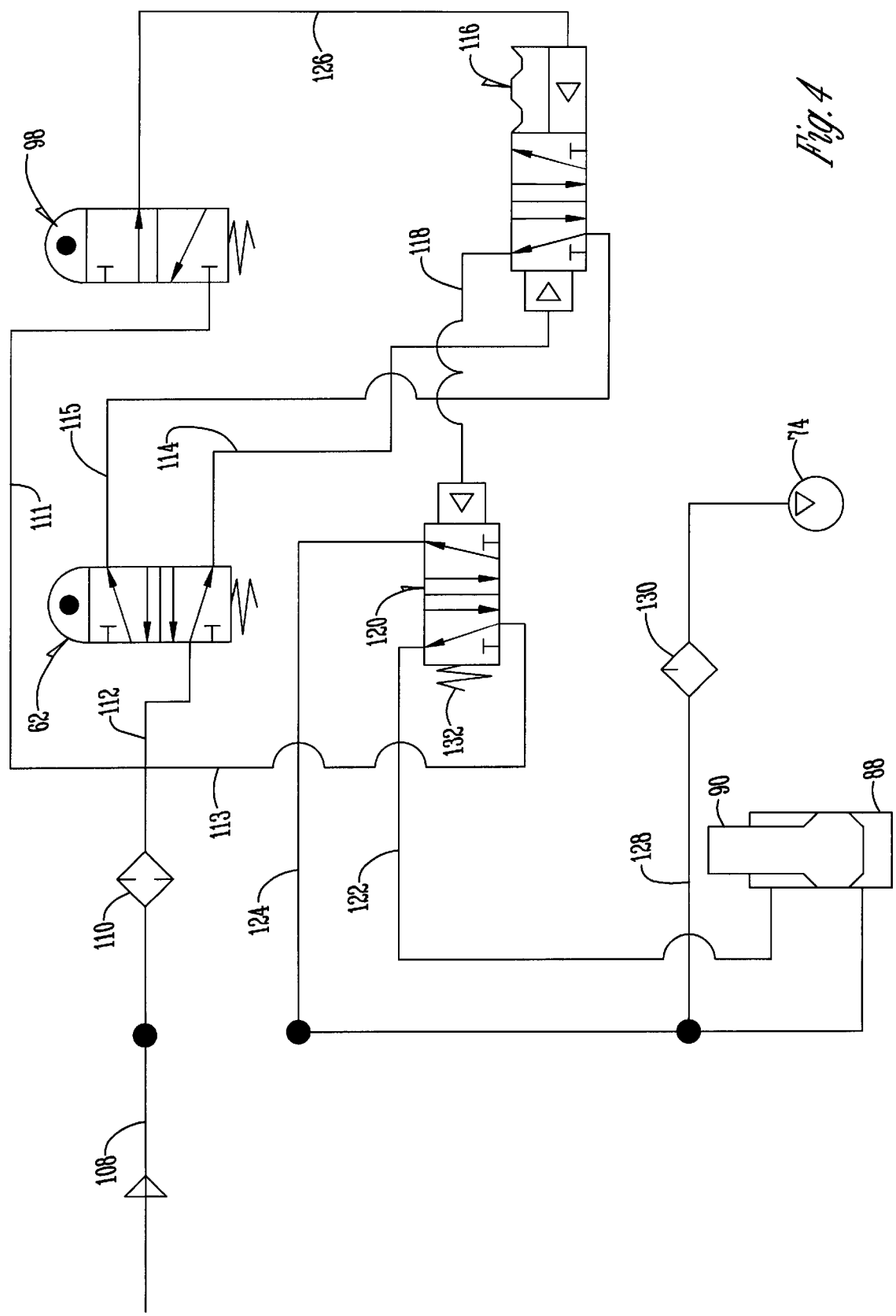
FIG. 4 is a schematic view of the pneumatic circuitry of the present invention.

A valve assembly 106 is also mounted to the plate 31. None of the various pneumatic components are shown in FIGS. 1 and 2 to be connected by hoses. However, FIG. 4 shows the schematic relationship of the lines which interconnect various pneumatic components.

An air pressure source is connected at 108 to the pneumatic circuit and introduces air under pressure through the air filter 110. The pressurized air is then distributed among three lines 111, 112, and 113. Line 111 is connected to the upper limit switch 98, which is closed when the switch arm 100 is in the position shown in FIG. 1.

Line 112 is connected to the master switch 62, which is in a first condition when the switch arm 64 is in the position shown in FIG. 1. In this position the air pressure from line 112 is introduced to line 114 which is connected to one end of a first spool valve 116 of valve assembly 106. This biases the spool valve 116 to the right as viewed in FIG. 4. In this position the line 115 is connected to line 118, but is not under pressure because line 115 is not introduced to pressure from line 112.

However, as the clamping arm 22 is moved downwardly to its lowermost operative position, the switch arm 64 causes switch 62 to switch fluid pressure from line 114 to line 115. Spool Valve 116 retains its position (moved to the right) even though fluid pressure has been removed from line 114. This causes fluid pressure to pass through spool valve 116 from line 115 to line 118, thereby moving a second spool valve 120 to the left as viewed in FIG. 4. This causes air pressure to be introduced from line 113 to line 124 for causing the double acting cylinder 88 to move rod 90 and reamer assembly 24 to their upper most position.

Pressure from line 124 also is introduced through line 128 and filter 130 to the pneumatic motor 74, thereby actuating the motor 74 to cause rotation of reamer bit 76.

Consequently, whenever clamp arm 22 is moved to its lower position, the motor 74 is actuated to rotate the reamer bit 76 and the double acting cylinder 88 is actuated to move the reamer bit 76 upwardly into the interior of the torch nozzle 14. The rotation of the reamer bit 76 reams out the deposits which are on the inside of the torch nozzle 14.

When the reamer assembly 24 reaches its upper most position, the horizontal leg 84 engages the roller 102 of the switch arm 100. This causes the switch 98 to introduce the pressure from line 111 to line 126 which in turn causes the spool 116 to be moved to its left position as viewed in FIG. 4, thereby disconnecting the fluid pressure from line 115 to line 118. Removal of the fluid pressure from line 118 causes spool 120 to move to its right-hand position as the result of the bias provided by spring 132. Consequently, the fluid pressure from line 113 is switched to line 122, thereby causing the double acting cylinder 88 to move the piston 90 and the reamer assembly 24 to its lower most position. Simultaneously, air pressure is removed from the motor 74 and the motor 74 is deactuated.

An important feature of the present invention is the fact that whenever the clamp arm 22 moves upwardly it causes the reamer assembly 24 to move to its lower inoperative position and also deactuates the motor 74. This happens automatically and does not depend upon any computerized sensing. Movement of the clamp arm 22 to is upper position automatically causes this response.

Another important advantage of the present invention is the fact that the shank end 52 of the pin assembly 40 automatically retracts whenever the torch nozzle 14 is moved upwardly. This permits the torch nozzle to be removed from the torch reamer without being pulled apart. This is an important feature when robots are used to move the torch 12 because the force exerted by the robot arm could cause damage to the torch 12 and the torch nozzle 14 if the clamping action is not immediately and automatically released.

In the drawings and specification there has been set froth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A torch reamer for removing deposits from the interior cylindrical surface of a welding torch nozzle, comprising:

a frame;

a work station located in a predetermined position relative to said frame;

a reamer assembly comprising a reamer bit and a motor connected to said reamer bit for rotating said reamer bit;

a clamping arm having a clamp thereon, said clamping arm being movably connected to said frame for movement from an operative position to an inoperative position;

a first spring yieldably urging said clamping arm to said imperative position;

said clamp having a clamp member movably mounted to said arm for movement from an unclamped position to a clamped position for clamping and gripping said welding torch nozzle;

first mechanism engaging said clamp member and being adapted to move said clamp member to said clamped position in response to said clamp arm moving to said operative position;

said first mechanism being adapted to move said clamp member to said unclamped position in response to said clamp arm moving from said operative position to said inoperative position;

said reamer assembly being mounted on said frame for movement from a retracted position to an extended position wherein said reamer bit extends within said nozzle cavity whenever said clamp is clamping and gripping said nozzle and said clamp arm is in said operative position.

2. A torch reamer according to claim 1 and further comprising a prime mover connected to said reamer assembly for moving said reamer assembly between said retracted and extended positions.

3. A torch reamer according to claim 2 and further comprising a control circuit connected to said clamp arm, said prime mover, and said motor for causing actuation of said motor and for causing said prime mover to move said reamer assembly to said extended position in response to said clamp arm being moved to said operative position.

4. A torch reamer according to claim 3 wherein said control circuit is adapted to cause deactuation of said motor and actuation of said prime mover to cause said reamer assembly to move to said retracted position in response to movement of said clamp arm from said operative to said inoperative position.

5. A torch reamer according to claim 4 wherein said control circuit is a pneumatic circuit, said motor and said prime mover being pneumatically powered.

6. A torch reamer according to claim 1 and wherein said first mechanism comprises a cam engaging said clamp member and causing said clamp member to move to said clamped position in response to movement of said clamp arm to said operative position.

7. A torch reamer according to claim 6 wherein said cam permits said clamp member to move to said unclamped position in response to movement of said clamp arm to said inoperative position.

8. A torch reamer according to claim 7 wherein said clamping member comprises a pin mounted to said clamp for sliding movement from said clamped to said unclamped positions.

9. A torch reamer according to claim 8 and further comprising a first clamp spring yieldably urging said pin to said unclamped position.

10. A torch reamer according to claim 9 and further comprising a second clamp spring permitting said pin to move from its clamped position in response to a predetermined force.

11. A method for reaming a torch nozzle having a cylindrical nozzle cavity surrounded by a cylindrical wall with deposits thereon, said method comprising:

inserting said nozzle into a clamp which is positioned on a clamping arm, said clamping arm being mounted on a frame for movement from an inoperative position to an operative position, said clamp arm being yieldably biased toward said inoperative position;

moving said nozzle into engagement with said clamp arm to cause movement of said clamp arm from said inoperative position to said operative position;

actuating a motor in response to movement of said clamp arm to said operative position to rotate a reaming bit connected to said motor;

moving said motor and said reaming bit from a retracted position to an extended position wherein said reaming bit extends within said cylindrical cavity and removes said deposits on said cylindrical walls of said cavity;

moving said nozzle to cause movement of said clamp arm from said operative position to said inoperative position;

deactuating said motor and moving said motor and said reamer bit to said retracted position in response to movement of said clamp arm to said inoperative position.

12. A method according to claim 11 and further comprising using said clamp to clamp and grip said nozzle when said clamp arm is in said operative position and unclamping said clamp from said nozzle in response to movement of said clamp arm to said inoperative position.

13. A method according to claim 12 and further comprising using a control circuit connected to said clamp arm and said motor and being adapted to cause actuation of said motor and movement of said motor and said reaming bit to said extended position in response to movement of said clamp arm to said operative position.

14. A method according to claim 13 and further comprising using said control circuit to deactuate said motor and move said motor and said reaming bit to said retracted position in response to movement of said clamp arm from said operative to said inoperative position.

15. A method according to claim 14 and further comprising using a pneumatically driven circuit for said control circuit.

16. A method for reaming a torch nozzle having a cylindrical wall forming a cylindrical cavity, said cylindrical wall having deposits thereon, said method comprising:

inserting said nozzle into a clamp which is positioned on a clamping arm mounted for pivotal swinging movement about a clamp arm axis from an inoperative position to an operative position, said clamp arm being yieldably biased toward said inoperative position;

moving said nozzle to cause movement of said clamp arm from said inoperative position to said operative position;

clamping said nozzle and gripping said nozzle with said clamp in response to movement of said clamp arm to said operative position;

using a rotating reaming bit to remove said deposits from said cylindrical wall of said nozzle while said clamp is gripping said nozzle;

moving said nozzle to cause movement of said clamp arm from said operative position to said inoperative position;

unclamping said clamp from said nozzle in response to movement of said clamp arm from said operative position to said inoperative position.

* * * * *

UNITED STATES PATENT AND TRADEMARK OFFICE
CERTIFICATE OF CORRECTION

PATENT NO. : 6,023,045
DATED : February 8, 2000
INVENTOR(S) : Mangelsen et al.

It is certified that error appears in the above-identified patent and that said Letters Patent is hereby corrected as shown below:

On the title page, Item [63], please insert:

-- Related U.S. Application Data

Provisional Patent Application 60/069,466 filed Dec. 15, 1997. --

Signed and Sealed this

Thirty-first Day of October, 2000

*Attest:*

Q. TODD DICKINSON

*Attesting Officer*     *Director of Patents and Trademarks*